UNITED STATES PATENT OFFICE.

LUCIEN MORISSE, OF PARIS, FRANCE.

PROCESS FOR THE TREATMENT OF THE MILKS OR LACTIFEROUS JUICES OF CAOUTCHOUC, GUTTA-PERCHA, AND BALATA AND THE LIKE.

No. 853,718.

Specification of Letters Patent.

Patented May 14, 1907.

Application filed December 20, 1905. Serial No. 292,659.

*To all whom it may concern:*

Be it known that I, LUCIEN MORISSE, a citizen of the Republic of France, and resident of Paris, France, have invented a new and useful Improvement in and Relating to an Improved Process for the Treatment of the Milks or Lactiferous Juices of Caoutchouc, Gutta-Percha, Balata, and the Like, which improvement is fully set forth in the following specification.

The lactiferous juices giving india rubbers (caoutchouc), plastic gums (gutta percha) and mixed gums (balatas) are evaporated as soon as collected and at the spot at which they are obtained, for conversion into a solid state in the form of loaves blocks, sheets or the like. It is in this solid condition that caoutchouc, gutta perchas and balatas reach the market.

From the point of view of the subsequent utilization of these products it is of great importance to be able to transport the lactiferous juices in a liquid state; this result is obtained by the process forming the subject of the present invention.

The operation is as follows: The bark of the trees from which the milk is to run is scraped and the points traversed by the latex coated with an aqueous solution rendered slightly alkaline. The milk is received beneath the incisions, after traversing the smallest possible path, in receptacles of any appropriate kind containing an alkaline or decalifying solution; ten volumes of this solution to the hundred for 60 grams of milk appear to give the best results, but these proportions are given by way of example only.

With regard to the transport of the milks, distinction must be made between the milks giving india rubbers (caoutchoucs) and those yielding either plastic gums (gutta perchas) or mixed gums (balatas).

In the case of milks furnishing india rubbers (caoutchoucs) all the milks are collected, at the place where they are obtained, in the vessels in which their transport is to be effected, and alkali or an alkaline or decalifying salt is again added to them, either by means of a solution a little stronger than that previously indicated, or by mixing liquid ammonia therewith. Three grams of ammonia per 100 grams of milk is a suitable proportion.

In the case of milks obtained from the hevea there is added to the receptacle in which they are to be transported, boiled water to which an antiseptic such as phenol or formol has been added. The proportion of 25% of boiled water containing four thousandths of an alcoholized solution of formol, for example, gives good results.

It is well to take the precaution never to leave the caoutchouc receptacles not full.

There is added to the milk of caoutchouc, upon arrival at the place at which it is to be utilized, a fresh dose of alkali, say liquid ammonia, but the proportion should be one half of that previously indicated.

For the transport of milks giving plastic or mixed gums, there is added on despatch a little boiled water to which formol has been added in a proportion which may vary in accordance with the season, because the latex is more liquid in the rainy season than in the dry season. As an indication, there may be employed for example, ten grams of a four thousandths solution of formol per liter. It should be ascertained that they are distinctly alkaline, otherwise they are rendered alkaline as in the case of caoutchouc milks.

Having now particularly described and ascertained the nature of my said invention and in what manner the same is to be performed, I declare that what I claim is:—

1. A process for the treatment of the lactiferous juices giving caoutchouc, gutta-percha and balata, which consists in applying to the surfaces of the trees over which the juices flow an alkaline solution.

2. A process for treating the lactiferous juices giving caoutchouc, gutta-percha and balata, which consists in applying to the surfaces of the trees over which such juices flow an alkaline solution, and in receiving such juices from the trees in vessels containing such a solution.

3. A process for the treatment of the lactiferous juices giving caoutchouc, gutta-percha and balata, which consists in applying to the surfaces of the trees with which such juices will come in contact an aqueous alkaline solution, in placing such a solution in the vessels into which the juices flow and the vessels in which they are transported, and also adding boiled water containing an antiseptic.

In testimony whereof I have signed this specification in the presence of two subscribing witnesses.

LUCIEN MORISSE.

Witnesses:
    EMILE LEDRET,
    H. C. COXE.